Feb. 16, 1965
A. ROTH
3,170,151
OPTICAL WALKING AID FOR THE BLIND
Filed April 20, 1962
3 Sheets-Sheet 1
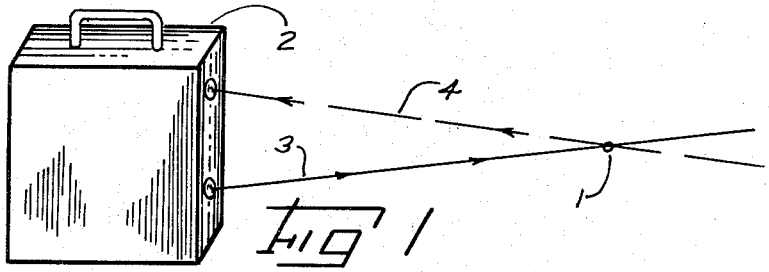
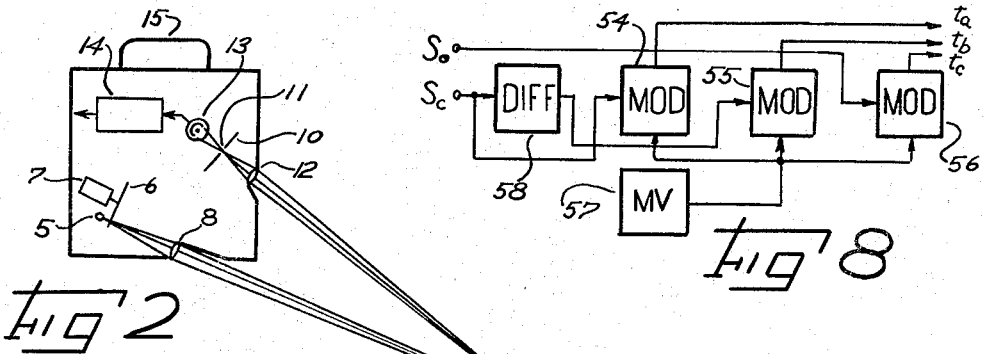
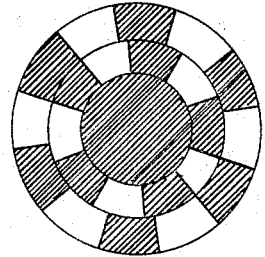
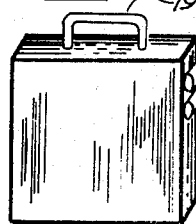
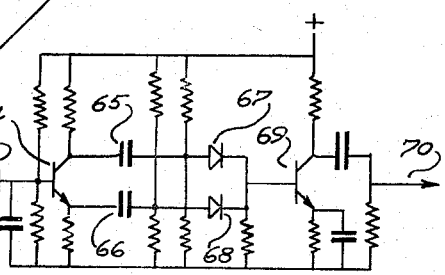
INVENTOR.
Alexander Roth

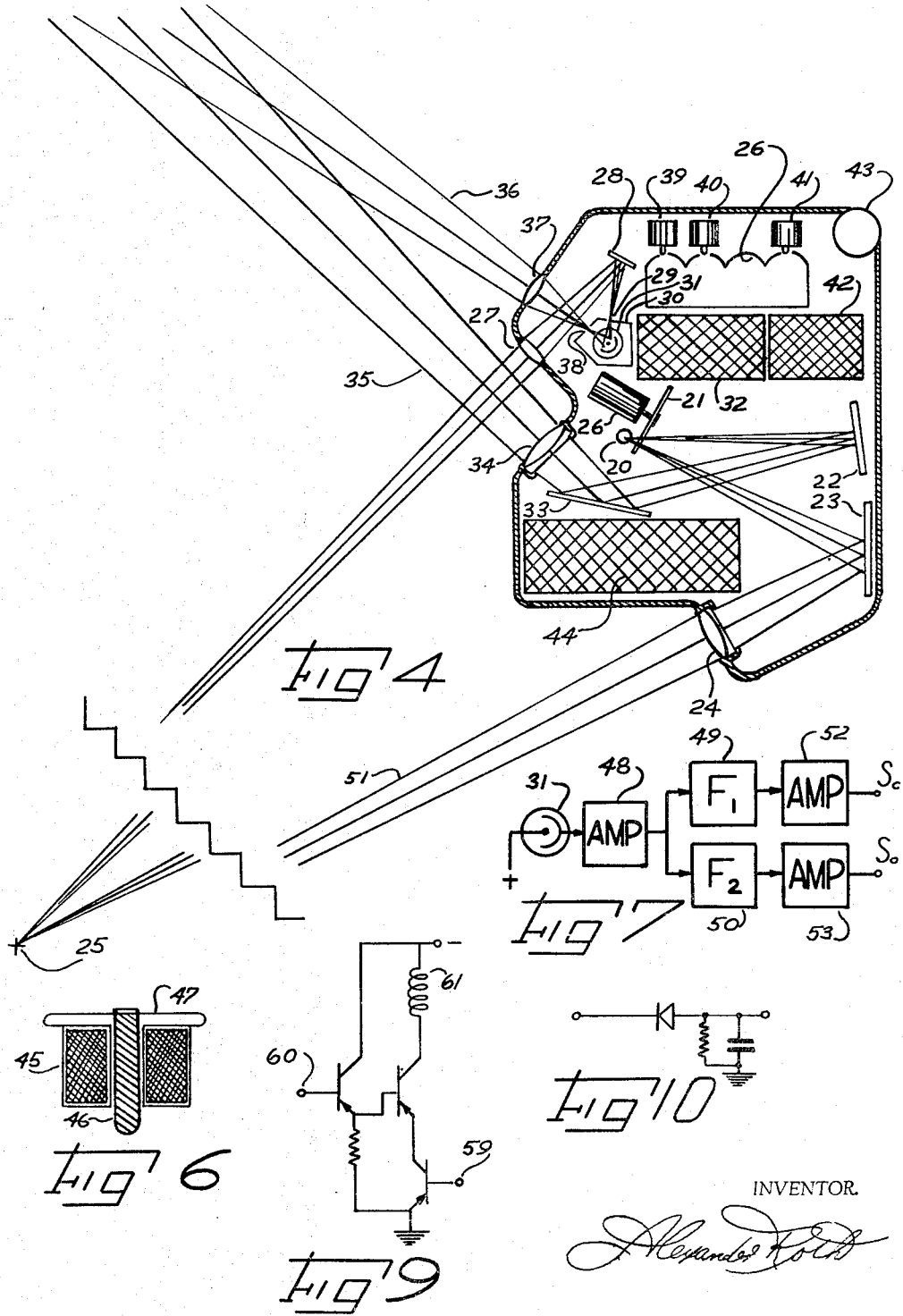

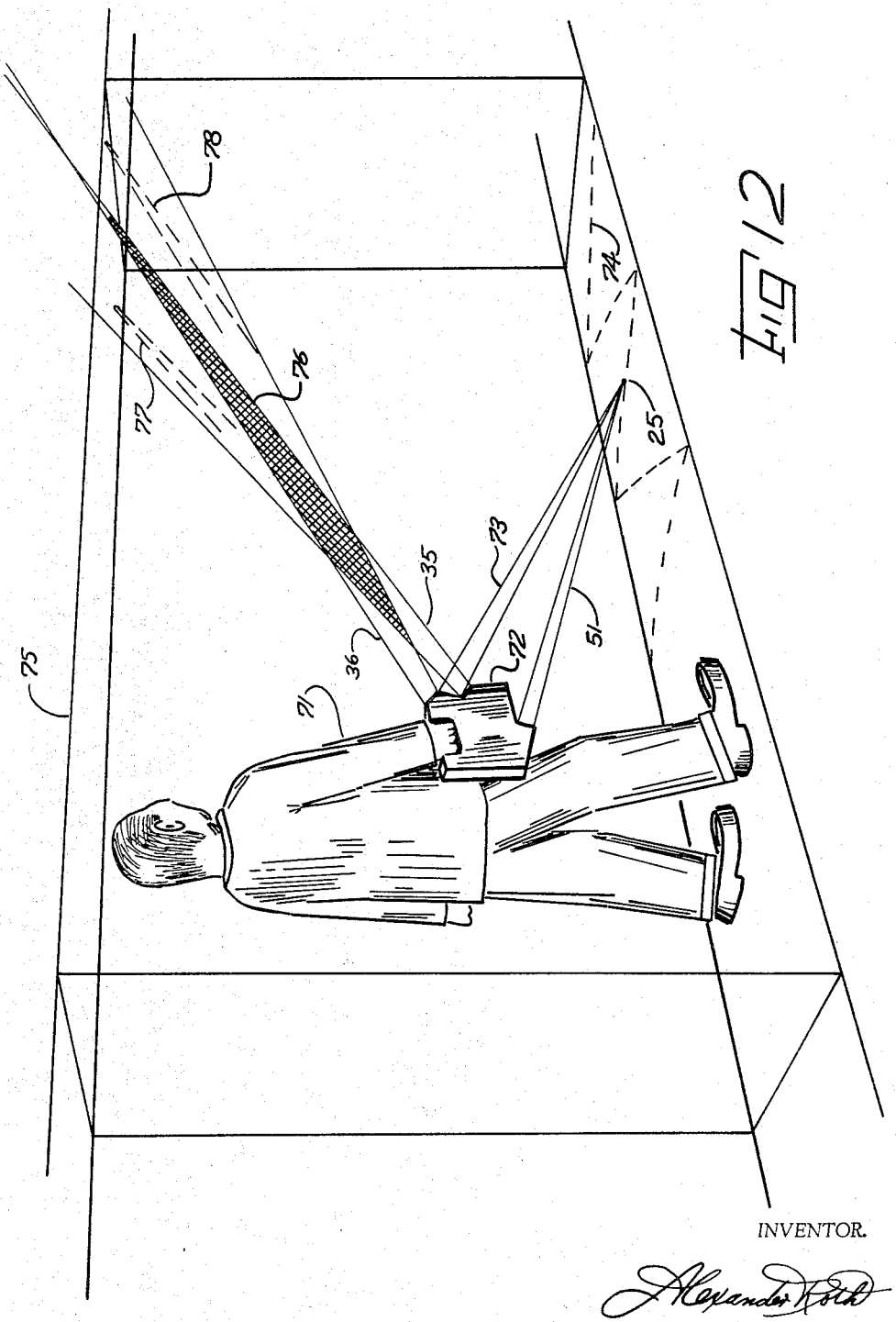

3,170,151
OPTICAL WALKING AID FOR THE BLIND
Alexander Roth, 166 S. 2nd Ave.,
Fort Walton Beach, Fla.
Filed Apr. 20, 1962, Ser. No. 189,140
1 Claim. (Cl. 340—213)

This invention relates to optical aids for the blind, specifically, devices for the detection of up and down steps and obstacles resting on the ground in the pathway of the user, and overhanging obstacles. It is a principal object of this invention to alert the user to up or down steps of less than two inches in height at a distance of approximately two normal strides ahead.

It is another object of my invention to alert the user to obsacles resting on the ground, directly in his path, when he is within approximately two normal strides of them.

It is a further object of my invention to alert the user to overhanging obstacles which may be encountered by parts of his body.

It is another object of my invention to alert the user to pitfalls, such as open sewers or manholes.

It is a further object of my invention to provide signals to the user which are indicative of the reflectivity of the pathway. In this way cracks between concrete slabs, or painted lines, etc., could become cues for navigation.

It is a further object of my invention that it be unaffected by usual ambient illumination such as brilliant sunlight, artificial illumination, etc.

In order to understand the advantages of the present invention, a brief review of some previous similar inventions follows.

"Blind-Aid" devices fall generally into two broad categories; optical and otherwise, such as acoustic, electromagnetic, etc. The greatest promise to date has been in the optical field. Among the optical devices, there are two broad categories. There are devices in which an attempt is made to reconstruct the scene more or less as it would be seen by a normal person and then to present this information to the blind user. The other group of devices may be broadly classed as navigation aids. These would include obstacle detectors and curb detectors. In the former group, the ability to reconstruct the scene and present this information in some reasonable way to a blind person has been very crude at best, and the usefulness of this information has been very limited. A goal concerned with the "navigational" instruments has been to determine the least number of measurements the instrument must make, and the least amount of information it must pass to the user, to permit the user to safely go from one place to another.

Concerning the navigational group, the obstacle detectors ascertain that there is nothing to walk into, and the curb detectors continuously appraise the condition of the pathway.

Obstacle detectors may automatically give the direction to a nearby obstacle, or may be manually scanned to obtain this information, they may be ranging, or nonranging. They may automatically scan vertically to yield the height of object, or may have to be scanned manually. Examples of obstacle detection systems are given by the following three patents: (1) Cranberg, Optical Ranging Device, 2,468,042; (2) Walker, Indicator for the Blind, 2,506,946; and (3) Walker, Indicator for the Blind, 2,582,-728. In Cranberg's device, a beam of intermittent light is transmitted from the instrument, impinges upon an obstacle, and is received by another lens. A rotating disc, with a coded pattern of apertures is placed in the image plane of the receiving lens so that the particular set of apertures the light returns through, depends upon the range to the obstacle. A characteristic tone is thusly developed and provides coarse ranging information. In Walker's devices, chopped light is emitted, and in one case distance is determined by means of triangulation using an oscillating mirror, and in the other case height is determined by displacing and scanning the beam vertically, and using different tones for different angles.

In order to detect steps or curbs it has generally been found necessary to be capable of measuring range precisely. If the range to the ground is precisely measured to some point ahead, then it is apparent that sudden changes in the rate of range will reveal the presence of a step. Other approaches have been to measure range precisely and note that for level ground, with a correct holding angle and a particular height, there is only one correct true range. Any increase or decrease of the range represents a step. Devices have been built which recognize and indicate to the user, whether the range to the ground ahead is correct high or low and thus indicate the presence of a step.

The present invention is both an obstacle and curb detector. Curbs are detected by measuring a single range, and if the instrument is held correctly, a confirmation signal produced by this single range measurement indicates that the pathway ahead is safe. A loss of signal indicates to the user that something is wrong, and the user then, as a result of prior training, will produce a short, rapid vertical scan with the instrument. Regaining the signal during this scan ascertains that there is not a pitfall ahead, while indicating to the user whether the step is up or down.

By designing the device so that it is preset to measure only a single range, very great simplicity results. Even greater simplicity is introduced with the requirement that the user be trained to hold the device at the correct angle eliminating automatic stabilization. Photographic tests of the steadiness with which the device can be held while walking, were made by the photochronographic technique. These tests confirmed that with only a few minutes of training it is possible for a person to hold the device steadily enough to be useful for the detection of up and down steps of two inches.

Overhanging obstacles are detected by transmitting a narrow cone of illumination ahead and upward. A second cone, intersecting the transmitting cone, represents the sensitive reception angle of a photo detector. The two cones intersect out to only several, say 10 feet. Any object which is positioned commonly to both cones will produce a signal in the photo detector. By properly aligning the cones with respect to the instrument and its usual position during use, the instrument will provide a warning signal when an object presents a threat to the user.

Thus, the present invention aids the user in two ways: (1) the pathway is scanned for obstacles and curbs, and (2) overhanging obstacles not resting on the ground are detected.

The invention will be described in the following specification by reference to the following drawings in which:

FIGURE 1 shows a general representation of the transmitting and receiving beams of the curb detector.

FIGURE 2 shows the major parts of the curb detector.

FIGURE 3 shows the beam arrangement for the obstacle detector.

FIGURE 4 shows a possible physical configuration for the guidance device.

FIGURE 5 shows the light chopping disc.

FIGURE 6 shows a tactile stimulator.

FIGURE 7 shows a block diagram of the pre-amplifier.

FIGURE 8 shows a block diagram of the tactile stimulator driver.

FIGURE 9 shows a schematic of part of the tactile stimulator driver.

FIGURE 10 shows a schematic of the demodulator.

FIGURE 11 shows a schematic of the signal differentiator.

FIGURE 12 shows the guidance device in use.

A basic requirement for the instrument used for curb detection, according to the techniques of this invention, is that it produces a signal when, and only when a surface of some object exists at a small point in space at a specific distance from the instrument, along a specific line emanating from the instrument, with nothing intervening. This is illustrated in FIGURE 1, where 1 is the point in space precisely located with respect to the instrument 2. A thin pencil of light emanating from the instrument is represented by 3. 4 represents a thin line on which a source must be located in order to produce a signal in a photocell located within the instrument 2. It is apparent that in order for the photocell to pickup the signal represented by ray 3, a surface of some object must be located at 1. If the surface is too near or too far, a return signal is not possible.

FIGURE 2 shows how the above may be accomplished for purposes of curb detection. A lamp 5 is located behind a chopping disc 6 driven by motor 7. The light passes through lens 8 and is focussed at point 9. A mask 10 has an aperture 11 situated with respect to lens 12 so that points 9 and 11 are conjugate foci. A photocell is placed at 13 and is connected to amplifier 14 to increase its signal. In FIGURE 2 the beams are shown oriented downward as they would normally be used for curb detection.

In normal use the device is held by its handle 15, as level and steadily as possible. The beam is adjusted for the particular user, so that under these conditions when it strikes level ground, the aperture will be so placed that it will accept the light from the ground at point 9 thereby producing a signal for the user. Signals arriving from any point other than 9 fail to pass through aperture 11 and are rejected by mask 10. Thus, when the device is in normal use, and aimed at the ground directly ahead, a signal will be received only for a specific holding angle (level). With simple training, the user can become very sensitive to this angle. This "angle-sensitivity" of the user is not critical, however, because of importance is not the angle, as much as the changes in this angle, as only these indicate the changes in the ground ahead.

By scanning to either side of directly ahead, while walking, a clear pathway is confidently established. A loss of tone which is regained by momentarily changing the angle of holding, reveals a step, or steps directly ahead. The type of step, whether up or down, is easily noted by noting the recurrence of the signal as the holding angle is suddenly changed. A complete loss of signal which cannot be regained indicates a hole or a wall.

It should be noted that the signal can be intermittently lost in synchronism with the scanning, and this would reveal to the user the presence of an object resting on the ground such as poles or people, etc.

Handicapped users often depend on many available clues to aid their navigation. The curb detector just described will also have a distinctive response to the following:

(1) Unusual surface features such as mottling, checkering, etc.
(2) Ground reflectivity and its changes.
(3) Thin obstacles, poles or a picket fence.
(4) Surface features such as cracks, curbstones, thresholds, etc.
(5) A line painted on the ground.

It should be noted that a line painted on the ground for the purpose, may be used to aid the guidance of the handicapped in certain areas.

The lamp 5 may be the source of visible or invisible radiation, and represents a source of any electromagnetic radiation. In addition, the only object of motor 7 and chopping disc 6 is to chop the light beam and that this may be accomplished in other ways such as modulating the voltage which drives the lamp 5.

FIGURE 3 shows how the obstacle detector portion of the guidance device operates. In this case a cone of illumination 16 is transmitted upwards and ahead. 17 represents the cone of reception of a photocell. Crosshatched area, area 18, represents the volume in space common to both beams. If the surface of any object rests somewhere in the volume 18, a signal will be picked up by the photocell. If the uppermost part of volume 18 extends to a point higher than the users head, when the device is held with handle 19, signals picked up by the photocell represent a warning of an object which may be collided with. In normal use the instrument would be scanned laterally so that the entire width of the user be protected.

The two types of instruments, curb detector and obstacle detector, described respectively in FIGURES 1 and 3 may be combined into one instrument and a possible configuration of such a device is illustrated in FIGURE 4. Referring to FIGURE 4, the light from lamp 20 shines through chopper disc 21 and part of the beam is reflected from mirror 22 and part from mirror 23. The chopping disc is so arranged that the light impinging upon 22 is chopped at a frequency different than that impinging 23. The lens 24 focusses the light beam to a small spot at some point 25. The distance from the lens to point 25 is normally such that the distance directed along the ground from directly beneath the instrument to point 25 is approximately equal to two strides of a normal individual, when the instrument is held like a suitcase, by handle 26. This distance could arbitrarily be any value and is selected on the basis of providing enough early warning to permit the user to come to a full stop if necessary before encountering an obstacle.

The chopper disc 21 is driven by motor 26 in order to modulate the light beam. The modulated light aids the differentiation between light from the source of the guidance device, and ambient illumination, such as sunlight or artificial lighting. In addition, the use of two modulation frequencies, make it possible to use a common photocell to receive the two beams. The receiving lens 27 focusses the light from point 25, upon reflection from mirror 28, exactly upon aperture 29 in housing 30 surrounding photocell 31.

It will be noted that only light emanating from point 25 focusses directly at aperture 29 and gets to photocell 31. If a reflecting or scattering surface had intercepted the beam from the lamp at a distance of either less or greater than the distance represented by point 25 (neglecting the effect of spot size) the modulated light would not be able to get back to the aperture 29 and thereby into photocell 31. Signals from the photocell enter the amplifier represented by crosshatched area 32. The obstacle detection beam originally reflected by mirror 22 takes a second reflection from mirror 33 and is focussed by lens 34 into conical beam 35. Cone 36 represents the desired cone of reception and is generated by second receiving lens 37 and second aperture 38 in photocell housing 30. Coupling to the user is obtained by means of three tactile stimulators 39, 40, and 41 in the handle 26. The tactile stimulators are driven by the tactile stimulator driver amplifier represented by volume 42. It should be noted that an auditory input to the user through an earphone, or other sensory inputs such as electric shock may also be used without changing the scope of this invention.

43 represents a rheostat control which is used to regulate the speed of the motor. In this way the user may regulate the frequency of the modulation and hold it within narrow limits. This permits the amplifier to be narrow banded and tuned to this frequency and thereby inhibit much of the noise generated within the amplifier as well as that noise generated by the ambient illumination. Crosshatched area 44 represents that area reserved for batteries.

FIGURE 5 shows a view of the chopper disc 21. Two different circular patterns are shown to provide the two separate modulation frequencies for the two beams as discussed earlier.

FIGURE 6 is a detail cross section of one of the tactile stimulators. 45 is a solenoid containing a coaxial movable magnetic plunger 46. The rounded end of the plunger 46 pokes the finger of the user through holes in the handle 26 of FIGURE 4. The plunger 46 is constrained, by leaf spring 47, to move in the axial direction upon application of a current in the coil 45. Proper action will be obtained if the current is alternating and has a frequency equal to the mechanical resonant frequency of the plunger-spring 46–47 combination.

FIGURE 7 shows a block diagram of the pre-amplifier. The block labeled AMP, 48, amplifies the output of the photocell 31. Amplifier 48 drives two frequency selective filters $F_1$, 49 and $F_2$, 50. Filter $F_1$ is selective to the frequency of the downward pointing beam, 51 of FIGURE 4, hereafter called the curb-detection beam, or curb beam. Filter $F_2$ is selective to the frequency of the upward pointing beam, 35 of FIGURE 4, hereafter called the obstacle beam. The filters feed amplifiers 52 and 53 respectively producing signals $s_c$ and $s_o$ (curb signal and obstacle signal) proportional to the intensity of reflections from the curb and obstacle beams, respectively, as picked up by photocell 31.

At this point, alternate choices exist for the use of the signals. Signals $s_c$ and $s_o$ may be combined and fed to an earphone to provide audible cues for the user. With adequate frequency separation the user may be made completely aware of reflections, and in which beam they exist. Any other form of human stimulus may also be used to provide coupling between the device and the user. If tactile stimulation is preferred, the signals $s_c$ and $s_o$ are fed to the inputs of an amplifier as block-diagrammed in FIGURE 8.

Because of the fact that much information in the form of cues may be contained in the changing components of the curb signal, and because of the fact that this type of tactile stimulator is not a particularly suitable transducer for rapidly changing information, it appears desirable to drive at least one tactile stimulator with the rate of change, the derivative, of the signal, instead of the signal itself. Three tactile stimulators are therefore required, one for the curb signal, one for the obstacle signal, and one for the derivative of the curb signal. Since a tactile stimulator requires a high frequency signal to resonate with, the stimulators are operated by being driven with a high frequency driving signal amplitude modulated by the information bearing signal. FIGURE 8 shows three modulators 54, 55, and 56 each having two inputs, one a high frequency signal from a multivibrator 57 which provides the signal for mechanical resonance, the other, a signal. The three signals are $s_c$, $s_o$ and the derivative of $s_c$ produced by differentiator 58. The three tactile stimulator driving signals, appearing at the outputs of the modulators, are $t_a$, $t_b$ and $t_c$.

FIGURE 9 shows a typical modulator. The signal from the multivibrator (57 of FIGURE 8) is applied to the input lead 59. The signal which will do the modulating is applied to 60. A current proportional to the product of the two signals is produced in the coil 61 which represents the solenoid of the tactile stimulator. The modulating signal at 60 must be a varying D.C. For this reason, two of the modulators 54 and 56 of FIGURE 8, require de-modulators at their input to extract the envelopes from the signals $s_c$ and $s_o$. A de-modulator is shown in FIGURE 10.

FIGURE 11 shows a possible schematic of the differentiator, 58 of FIGURE 8. A signal input at 62 is de-modulated by diode 63 and the de-modulated signal is amplified by transistor 64. Since transistor 64 provides both inverting and non-inverting outputs, either positive or negative going changes in the signal at 62 will produce both positive and negative signals at capacitors 65 and 66. By the process of differentiation, the capacitors 65 and 66 will permit only the changing component of the signal to pass to diodes 67 and 68, through which only positive signals will be passed on to transistor 69. Because transistor 69 inverts, a negative signal at the output 70 will exist for every positive or negative going signal at the input 62. The differentiator thus provides a unipolar output for the tactile stimulator which is the time derivative of the beam signal.

FIGURE 12 shows the intended method of use of the walking aid. The user 71 holds the device 72 as he would a valise. If the device had been properly adjusted for the user, the beam 51 will focus exactly on the ground at 25, and the lines 73 representing the "look angle" of the receiving photocell, will also converge on the ground at spot 25. In normal use, the user will laterally scan the device to produce the locus shown by the dotted line 74. As long as the user continues to receive the $s_c$, curb signal, he is confident that the pathway ahead is safe. Solid rectangle 75 represents an imaginary corridor, the floor, space and ceiling of which must be "swept clear" to permit safe passage. The object detector beam is shown at 76 sweeping through positions 77 and 78 during scanning. It will be recalled that the object detector beam 76 is the intersection of the conical beam 35 with the conical look angle 36. A vertical edge of the corridor 75 may in reality be the edge of a building, or a line of shrubbery, etc. The user could direct himself alongside such a landmark, with no actual physical contact, by noting the brief intermittencies of the curb signal at one extreme of the scan.

While I have shown what I believe to be the best embodiment of my invention, I do not wish, however, to be confined to the embodiment shown, but what I desire to cover by Letters Patent is set forth in the following claim.

I claim:

In an optical walking aid for the blind, means for producing a converging beam, first focussing means for focussing said converging beam, second focussing means for focussing reflections of said converging beam, a photocell, a fine aperture positioned between said photocell and said second focussing means, whereby said fine aperture admits reflections of said converging beam only from a specific point along said converging beam, means for producing a divergent beam, third focussing means for focussing said diverging beam, fourth focussing means for focussing reflections of said diverging beam, a coarse aperture positioned between said photocell and said fourth focussing means, whereby said coarse aperture admits reflections of said diverging beam from any point between two specific distances along said diverging beam, said photocell being responsive to the reflections admitted by either of said apertures, means for separately modulating said converging and diverging beams, means for amplifying the electrical signal from the photocell, and means connected to said amplifying means for producing a sensory stimulus.

References Cited by the Examiner

UNITED STATES PATENTS

| 2,506,946 | 5/50 | Walker | 340—228 X |
| 2,582,728 | 1/52 | Walker. | |
| 2,600,708 | 6/52 | Ulrich | 340—1 |

OTHER REFERENCES

Chechik, N.: "Light Locator for the Blind," in Radio U.S.S.R., June 1955, page 63.

Chechik, N.: "Light Locator for the Blind," in Electronic Design, September 1955, page 168.

NEIL C. READ, *Primary Examiner.*